(12) United States Patent
Jung et al.

(10) Patent No.: US 12,296,532 B2
(45) Date of Patent: May 13, 2025

(54) LAMELLA COVER

(71) Applicant: EOS GmbH Electro Optical Systems, Krailling (DE)

(72) Inventors: Frank Jung, Gauting (DE); Hans Perret, Munich (DE); Uwe Starr, Greifenberg (DE)

(73) Assignee: EOS GmbH Electro Optical Systems, Krailling (DE)

( * ) Notice: Subject to any disclaimer, the term of this patent is extended or adjusted under 35 U.S.C. 154(b) by 444 days.

(21) Appl. No.: 17/597,283

(22) PCT Filed: Jun. 24, 2020

(86) PCT No.: PCT/EP2020/067727
§ 371 (c)(1),
(2) Date: Dec. 30, 2021

(87) PCT Pub. No.: WO2021/004796
PCT Pub. Date: Jan. 14, 2021

(65) Prior Publication Data
US 2022/0314531 A1    Oct. 6, 2022

(30) Foreign Application Priority Data
Jul. 9, 2019   (DE) .................. 10 2019 210 110.0

(51) Int. Cl.
*B29C 64/153* (2017.01)
*B29C 64/236* (2017.01)
(Continued)

(52) U.S. Cl.
CPC .......... *B29C 64/153* (2017.08); *B29C 64/236* (2017.08); *B29C 64/25* (2017.08); *B33Y 30/00* (2014.12); *B33Y 10/00* (2014.12)

(58) Field of Classification Search
None
See application file for complete search history.

(56) References Cited

U.S. PATENT DOCUMENTS

2011/0297675 A1    12/2011  Johnson et al.
2017/0129181 A1*    5/2017  Kunioka ................. B22F 12/17

FOREIGN PATENT DOCUMENTS

CN    206952655 U  *  2/2018  ......... B23Q 11/0816
CN    108099188        6/2018
(Continued)

OTHER PUBLICATIONS

English translation of DE-102005013496-A1 by EPO. (Year: 2006).*
(Continued)

*Primary Examiner* — Xiao S Zhao
*Assistant Examiner* — Inja Song
(74) *Attorney, Agent, or Firm* — Polsinelli PC

(57) ABSTRACT

An additive manufacturing device for manufacturing a three-dimensional object by selective solidification of a building material layer by layer, including a process chamber having a chamber wall, wherein the chamber wall of the process chamber has at least one elongate opening. The device includes a cover device having a cover area for covering and/or shielding the at least one opening, the extent of the cover area being variable in the longitudinal direction of the opening, and the cover device includes a plurality of individual elements of similar type that are connected to one another in such a way that they are movable relative to one another in the longitudinal direction of the opening.

14 Claims, 10 Drawing Sheets

(51) Int. Cl.
  *B29C 64/25* (2017.01)
  *B33Y 10/00* (2015.01)
  *B33Y 30/00* (2015.01)

(56) References Cited

FOREIGN PATENT DOCUMENTS

| CN | 207954664 U | 10/2018 | | |
|---|---|---|---|---|
| CN | 208558319 U | 3/2019 | | |
| DE | 202004018318 U1 | * | 3/2005 | ......... B23Q 11/0825 |
| DE | 102005013496 A1 | * | 10/2006 | ......... B23Q 11/0816 |
| DE | 202007007616 | | 9/2007 | |
| DE | 102014100176 | | 7/2014 | |
| DE | 102014113113 A1 | * | 3/2016 | ......... B23Q 11/0816 |
| DE | 102015213008 | | 1/2017 | |
| DE | 102015118161 A1 | | 4/2017 | |
| DE | 102016123281 | | 6/2018 | |
| EP | 1204517 | | 5/2002 | |
| EP | 1871568 | | 1/2008 | |
| WO | 0078519 | | 12/2000 | |

OTHER PUBLICATIONS

English translation of DE-102014113113-A1 by EPO. (Year: 2016).*
English translation of CN-206952655-U by EPO. (Year: 2018).*
English translation of DE-202004018318-U1 by EPO. (Year: 2005).*
Hendrixson, S., "AM 101: Hybrid Manufacturing," Additive Manufacturing, Aug. 29, 2019, 6 pages. Retrieved from the internet. <https://www.additivemanufacturing.media/kc/what-is-additive-manufacturing/articles/am-101-hybrid-manufacturing>.
PCT International Search Report for Application No. PCT/EP2020/067727, dated Sep. 28, 2020, 2 pages.
Merklein, M. et al., "Hybrid Additive Manufacturing Technologies—An Analysis Regarding Potentials and Applications", Physics Procedia, Elsevier, Bd. 83, Sep. 16, 2016, pp. 549-559, doi: 10.1016/j.phpro.2016.08.057.

* cited by examiner

LAMELLA COVER

TECHNICAL FIELD OF THE INVENTION

The present invention relates to a device and a method for manufacturing a three-dimensional object by selectively solidifying a building material layer by layer, and a cover device for covering/screening an opening in a chamber wall of the device for manufacturing a three-dimensional object.

BACKGROUND OF THE INVENTION

Said method for manufacturing objects is commonly referred to as an additive manufacturing method. Additive manufacturing devices and corresponding methods are generally characterized in that objects are produced by solidifying a formless building material layer by layer. The solidification can be effected, for example, by supplying thermal energy to the building material by means of irradiating it with electromagnetic radiation or particle radiation (e.g. laser sintering (SLS or DMLS) or laser melting or electron beam melting). For example, in laser sintering or laser melting, the impact area of a laser beam on a layer of the building material is moved across that locations of the layer that correspond to the object cross-section of the object to be produced in this layer.

As a rule, the additive manufacturing process takes place in a process chamber, which serves on the one hand to shield the building material from environmental influences and on the other hand to hold the formless building material. In particular, if solidification of formless building material takes place by means of heat energy in the process chamber, the wall of the process chamber can also serve to shield the environment from the heat within the process chamber. Since individual parts of the additive manufacturing device within the process chamber, for example a recoater for applying the building material layers or an irradiation device, are generally controlled from outside the process chamber, the chamber wall of the process chamber generally has apertures or openings to enable connection to the respective parts of the additive manufacturing device. For example, drive axes or guide arms can be passed through such openings. However, such openings also weaken the shielding effect of the chamber wall or, under certain circumstances, allow building material to escape and/or ambient factors, in particular ambient particles, to enter. Therefore, it is desirable to choose said openings to be as small as possible and to keep them closed as much as possible.

SUMMARY OF THE INVENTION

It is therefore an object of the invention to provide a cover device for reversibly covering an opening in a chamber wall of a process chamber, as well as a corresponding additive manufacturing device and a corresponding additive manufacturing method, by means of which an opening in a chamber wall can be closed as quickly as possible.

The features described in connection with an inventive device can also be used for further development of another inventive device, even if this is not explicitly stated.

According to the invention, an additive manufacturing device for manufacturing a three-dimensional object by selective solidification of a building material layer by layer, comprising a process chamber having a chamber wall, wherein the chamber wall of the process chamber has at least one elongate opening, is characterized by a cover device having a cover area for covering and/or shielding the at least one opening, the extent of said cover area being variable in the longitudinal direction of the opening, and the cover device comprising a plurality of individual elements of similar type connected to one another in such a way that they are movable relative to one another in the longitudinal direction of the opening.

Additive manufacturing devices and methods to which the present invention relates are in particular those wherein energy is selectively applied as electromagnetic radiation or particle radiation to a layer of the building material. In this regard, the working plane is a plane in which the upper side of the layer to which the energy is supplied is located. Here, the energy input device can comprise, for example, a laser or an electron beam source. In particular, the invention relates to methods and devices in which heat is supplied to the building material by means of radiation, such as laser sintering or laser melting or electron beam melting.

It should also be noted at this point that by means of an additive manufacturing device according to the present invention, not only one object but also several objects can be produced simultaneously. Whenever the present application refers to the production of an object, it is understood that the respective description is equally applicable to additive manufacturing methods and devices in which multiple objects are produced simultaneously.

Since the cover device according to the invention comprises a plurality of individual elements, only a smaller mass is to be accelerated when the extent of the cover area is changed compared to a one-piece rigid cover area, specifically only the mass of one individual element or a small number of individual elements. Therefore, the opening in the process chamber can be closed quickly, so that only for a short time, or even essentially not at all, a transfer of material and energy through the opening takes place, and thus the interior of the process chamber is sealed off in a better way from the external environment. Here, the cover area is the area of the opening which is covered/shielded by the individual elements of the cover device in such a way that the passage of material and energy is reduced.

Compared with cover devices in which the cover area is varied by winding and unwinding a flexible membrane, i.e. a roller blind, the invention has the advantage that the individual elements can be designed to be more robust and, in particular, can have greater heat resistance. In the case of a roller blind, the heat resistance and robustness of the material are limited by the fact that it must be flexible. Furthermore, in the case of a flexible roller blind, the thermal insulation is limited by the flexible membrane, since the latter is limited in thickness so as not to restrict the flexibility of the membrane.

In summary, the design of the cover device according to the invention proves to be advantageous especially in additive manufacturing devices as it can best meet the speed requirements and thermal insulation requirements.

Preferably, the extent of the cover area in the longitudinal direction of the opening can be varied by a relative movement of the individual elements with respect to one another in the longitudinal direction of the opening.

By moving the individual elements relative to one another, it is possible to vary the extent of the cover area by moving only one or a small number of individual elements, whereby only small masses have to be accelerated and thus an opening in the chamber wall of a process chamber can be closed more quickly or the individual elements can be moved more quickly.

Further preferably, a connection element can be arranged between two individual elements each.

The presence of a connection element, preferably between two individual elements each, gives greater stability to the cover device without losing the advantage of the movement of small masses. A design of the cover device without this feature is possible, but only works well if the movement when closing the opening also has a directional component in the direction of gravity (as in the case of a venetian blind).

Further preferably, at least two individual elements, preferably two individual elements each, are connected to one another by means of an elastic element, in particular a spring element, preferably a return spring, as a connection element.

If a connection element connecting two individual elements to one another, preferably a connection element arranged between two individual elements in each case, has elasticity in the direction of movement of the individual elements, then stability is increased as a result. In particular, a restoring force can then be provided which moves the individual elements against each other in such a way that the extent of the cover device is reduced and/or increased so that the opening is closed without external force acting on the cover device, for example in the event of a failure of system components as a result of, for example, a fault in the power supply.

The elasticity can be brought about by the connection element having a spring element which can provide a restoring force in the direction of movement of the individual elements relative to one another. For this purpose, either a spring element suitable for this purpose together with further components can form the connection element, or the connection element as such is a spring element. Examples of the design of the spring element would be a helical spring, a leaf spring, a spiral spring, etc. Instead of the spring element, an element formed from an elastic material, e.g. rubber, can also be used. However, it is difficult to find suitable materials for this purpose, especially at high temperatures in the process chamber, e.g. during laser sintering or laser melting of polymers.

In particular, the elastic element can be connected to an individual element by means of a hinge. By connecting a connection element to one, preferably both, of the two individual elements via a hinge joint, better movability of the individual elements relative to each other can be provided. In particular, this reduces an impediment to movement caused by a strong restoring force of an elastic element. Thus, it can be caused that the force for initiating a movement of the individual elements is very small, but with increasing extent of the cover device a larger force has to be applied.

Further preferably, the individual elements comprise lamellas which are aligned substantially parallel to one another, wherein in particular a connection element arranged between two individual elements engages at a lamella support extending transverse, preferably perpendicular, to a lamella plane.

Preferably, the lamellas extend approximately parallel to the opening to be covered in the wall of the process chamber when the cover device has its greatest extent in the longitudinal direction of the opening. By the presence of a lamella support in an individual element the lamella is not impaired in its covering function by reducing its cover area by the attachment of a connection element thereto. Such a lamella support is preferably attached to the side of the cover device facing the inside of the process chamber. Since it preferably extends transverse to the direction in which the lamella extends, leverage is provided when the individual element moves, thus allowing the latter to be moved rapidly with little exertion of force.

In a preferred embodiment two connection elements engage on either side of an individual element at different points on the individual element, in particular its lamella support. In this case, when the connection elements exert a force on the individual element, a tilting moment is created which results in the lamella of the individual element being pressed against the adjacent individual element at the same time as the extent of the cover device is increased. This increases the sealing effect. Here, it is understood that the tilting moment can only be generated if the two engagement points of the connection elements are at a different distance perpendicular to the opening to be covered or perpendicular to the surface of the lamella.

In particular, adjacent lamellas can overlap if the opening is not completely covered.

In the overlapping state, the faces of the individual lamellas are preferably approximately parallel to one another and approximately parallel to the opening to be covered. With this embodiment of the cover device, it can be achieved that in any opening state of the cover device or for any degree of covering of the opening, it is ensured that the covered portion has a high tightness. This would not be the case if a small extent of the cover device were caused by tilting the lamellas relative to the plane of the opening to be covered.

Preferably, the lamellas have a heat-reflecting surface and are preferably made of metal.

Lamellas with the aforementioned characteristics can be realized, for example, by highly polished thin metal sheets, e.g. stainless steel sheets, which have a low thermal conductivity. Optionally, a thin layer of a highly reflective metal can be applied to improve heat reflection, which is also particularly suitable if the lamella body is formed of a non-metal, for example a plastic with a high melting temperature, e.g. a polyaryletherketone.

Preferably, the additive manufacturing device further comprises a process module movable within the process chamber in a direction of movement B across a build area, the process module being suited to carry out a process required for producing a three-dimensional object, wherein the direction of movement B is parallel to the longitudinal direction of the opening, and wherein an external connection element is attached to the process module, which external connection element passes through the opening.

The process module is a device that is part of the additive manufacturing device and is suited to carry out a process step required for producing a three-dimensional object, in particular a process step in which a component of the device is moved relative, in particular substantially parallel, to a building material layer, thereby also resulting in a movement relative to the process chamber. A corresponding process step can be, for example, the application of a building material layer, wherein a recoating module or a part thereof (e.g., an application blade or application roller) is moved across the build area. Another example would be an exposure module used to supply radiation energy to individual positions of a building material layer, i.e. to selectively solidify the building material. Movement of parts of the exposure module could involve moving a beam deflection device (scanning device) parallel to the building material layer, thereby ensuring an angle of radiation incidence on the building material layer as perpendicular as possible. Another example would be an exposure row or VCSEL array that is moved across the build area. Finally, the process module can also be, for example, a device that is moved across the build area to monitor the manufacturing process, such as a temperature measurement device or a melt pool monitoring device.

The external connection element is a physical connection element by means of which the process module is connected to a location outside the process chamber. For example, the external connection element could be a guide arm that moves the process module and is connected to a corresponding drive outside the process chamber. Alternatively, the external connection element ca be an electrical supply cable or a supply line that is moved together with the process module, for example in a case where the drive unit for the process module is arranged inside the process chamber and is moved along with the process module or in a case where the supply line serves to supply and/or discharge a cooling liquid or a building material.

Further preferably, the cover device is connected to the external connection element in such a way that when the external connection element moves in the longitudinal direction of the opening, the extent of the cover area is varied in the longitudinal direction of the opening.

Although it is possible to adjust the cover area of the cover device separately from the movement of the external connection element, it is advantageous if the individual elements are moved along by the external connection element. In this case, when the external connection element is moved, the opening in the wall of the process chamber is automatically opened and closed. Such an approach is possible in particular because the cover device has a plurality of individual elements and thus only small masses (namely those of a small number of individual elements) are moved. This results in only a small additional load on the drive that is responsible for the movement of the external connection element.

Preferably, a cover device is arranged in the longitudinal direction of the opening on both sides of the external connection element.

Preferably, the two cover devices are connected to the external connection element in such a way that when the external connection element moves in the longitudinal direction of the opening, the extent of the respective cover area is varied in the longitudinal direction of the opening. When the external connection element is moved, the cover area of one cover device is then increased, while at the same time the cover area of the other cover device is decreased. The presence of two cover devices adjacent to the external connection element makes it possible to cover or shield the entire opening in the chamber wall, with the exception of the region that is occupied within the opening by the external connection element and the immediate vicinity of this region. Thus, the interior of the process chamber can be particularly effectively shielded from the surroundings of the process chamber.

In a preferred embodiment, a sealing sleeve surrounds the external connection element at the position at which it passes through the opening. In this case, the sealing sleeve is suitable for lowering or even preventing a passage of material and energy through the opening, in particular at the boundary between the sealing sleeve and the external connection element. Further preferably, the sealing sleeve is connected in each case to that individual element of the cover devices that is located closest to the external connection element. The connection of the sealing sleeve to the individual elements is such that a passage of material and energy through the opening at the boundary between the sealing sleeve and the individual elements is lowered or even prevented. The connection can be designed, for example, as a clamping connection, adhesive connection, etc.

Preferably, the cover device is mounted on the edges of the opening (31) in such a way that it can be disassembled.

Due to the reversible demountability of a cover device it can be removed from the process chamber without difficulty and without permanent changes to the chamber wall, which is convenient for maintenance actions in the process chamber but also expedient for cleaning or repair processes on the cover device. For this purpose, for example, a housing or a frame of the cover device in which the individual elements are held can be unscrewed, for example, from the wall of the process chamber.

In principle, the individual elements of a cover device can engage the edge of the opening to be covered, so that they are guided in their movement by the edge of the opening, for example by the lamella supports enclosing the edge of the opening in a U-shape, or else just sliding along the edge of the opening, or being enclosed by the edge in a U-shape. However, it is also possible for a rail, along which the individual elements move when varying the extent of the cover area, to be a component of the cover device, for example a component of the frame or housing, and then to be reversibly removable from the process chamber together with the cover device.

A cover device according to the invention for reversibly covering an elongate opening in a chamber wall of a process chamber of an additive manufacturing device for manufacturing a three-dimensional object by selective solidification of a building material layer by layer comprises a cover area for covering and/or shielding the opening, wherein the extent of the cover area is variable in the longitudinal direction of the opening and the cover device comprises a plurality of individual elements of similar type that are connected to one another in such a way that they are movable relative to one another in the longitudinal direction of the opening. Preferably, here the cover device is capable of completely covering the elongate opening and/or shielding the entire opening.

According to the invention, an additive manufacturing method for manufacturing a three-dimensional object by selective solidification of a building material layer by layer within a process chamber having a chamber wall that has at least one elongate opening is characterized in that the at least one opening is covered and/or shielded by a cover device having a cover area the extent of which is variable in the longitudinal direction of the opening, the cover device comprising a plurality of individual elements of similar type that are connected to one another in such a way that they are movable relative to one another in the longitudinal direction of the opening.

In the additive manufacturing process according to the invention, the use of a cover device comprising a plurality of individual elements of similar type can ensure that openings in a wall of the process chamber, which are used for passages to components of the manufacturing device during a manufacturing process, can be closed quickly and reliably.

Preferably, in the additive manufacturing method according to the invention, furthermore a process module is present within the process chamber, which process module is movable in a direction of movement B across a build area and suited to carry out a process required for producing the three-dimensional object, the direction of movement B being identical to the longitudinal direction of the opening, wherein an external connection element is attached to the process module, which external connection element passes through the opening,
wherein during manufacture the process module moves at a speed of at least 200 mm/s, preferably at least 400 mm/s, particularly preferably at least 600 mm/s and at a maximum speed of 800 mm/s and/or is subjected to an acceleration of at least 1 m/s$^2$, preferably at least 10 m/s$^2$ mm/s, particularly preferably at least 20 m/s$^2$ and at most 30 m/s$^2$.

As a result of the small mass of the individual elements, it is possible to close or open the opening in the wall of the process chamber at high speed. However, this also makes it possible to carry out individual process steps in the process chamber at high speed, in which, for example, a process module is moved from outside the process chamber by means of a guide arm. The corresponding process steps are not noticeably slowed down by the change in the cover area of the cover device.

BRIEF DESCRIPTION OF THE DRAWINGS

Further features and expediencies of the invention will be apparent from the description of exemplary embodiments by reference to the accompanying figures.

Figure 1:
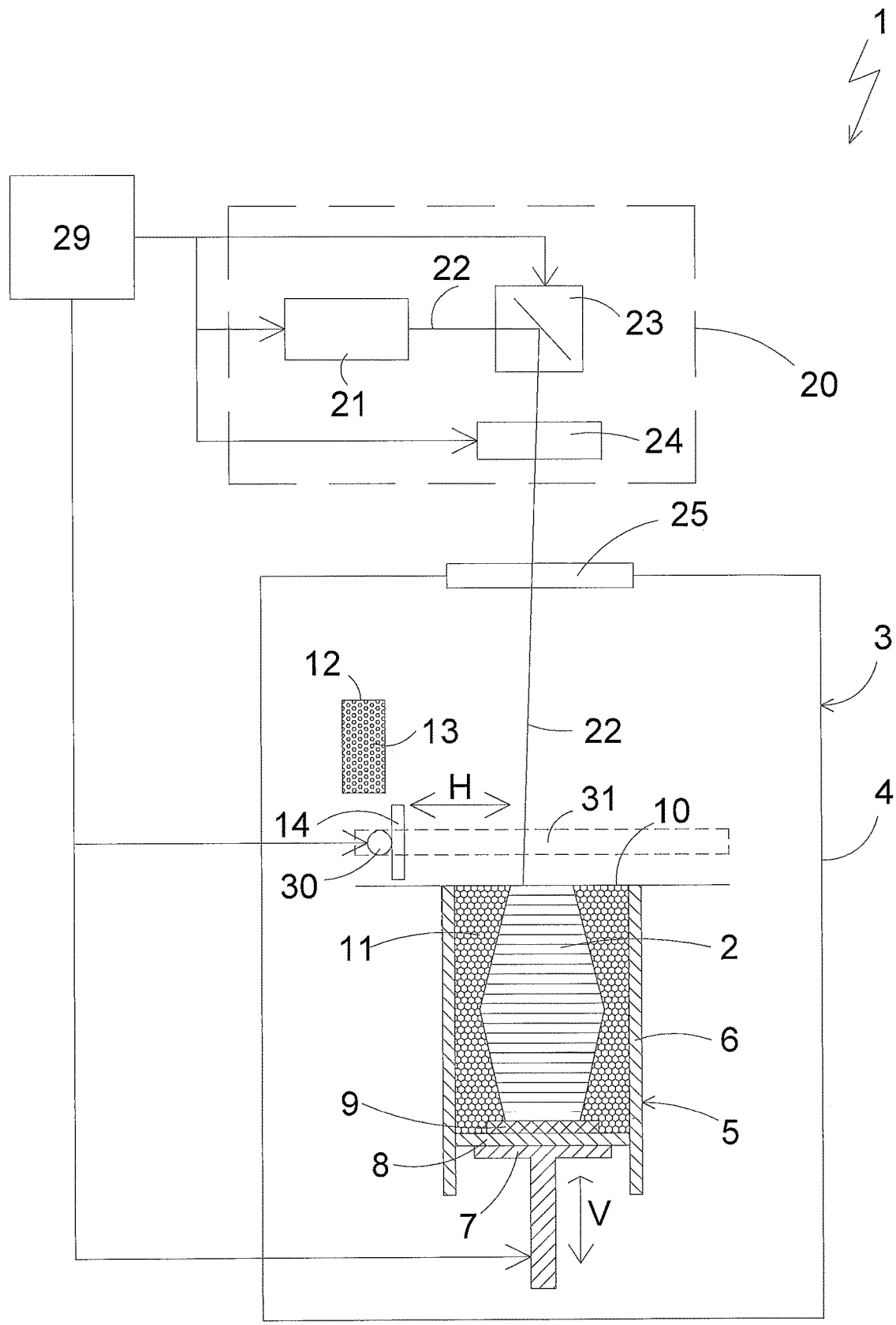
FIG. 1 is a schematic view of an exemplary device for additive manufacturing of a three-dimensional object according to an embodiment of the invention, partially depicted in cross-section.

For a description of the invention, an additive manufacturing device according to the invention will first be described below with reference to FIG. 1 using the example of a laser sintering or laser melting device.

For building an object 2, the laser sintering or laser melting device 1 contains a process chamber or build chamber 3 with a chamber wall 4. A building container 5 open to the top and having a container wall 6 is arranged in the process chamber 3. A working plane 10 is defined by the upper opening of the building container 5, wherein the area of the working plane 10 located within the opening, which area can be used for building the object 2, is referred to as the build area.

A support 7 movable in a vertical direction V is arranged in the building container 5, to which support a base plate 8 is attached that closes the container 5 to the bottom and thus forms its base. The base plate 8 can be a plate formed separately from the support 7, which is attached to the support 7, or it can be formed integrally with the support 7. Depending on the powder and process used, a building platform 9 can also be attached to the base plate 8, on which building platform the object 2 is built. However, the object 2 can also be built on the base plate 8 itself, which then serves as the building platform. In FIG. 1, the object 2 to be formed in the building container 5 on the building platform 9 is shown below a working plane 10, which is defined by the upper edge of the container 5, in an intermediate state with several solidified layers surrounded by building material 11 that remained unsolidified.

The laser sintering or melting device 1 further comprises a storage container 12 for a building material 13, in this example a powder that can be solidified by electromagnetic radiation, and a recoater 14 movable in a horizontal direction H for applying the building material 13 to the working plane 10. For moving the recoater module 14, a drive not shown in detail is provided outside the wall 4 of the process chamber 3. The recoating module 14 is connected to the drive by means of a guide arm 30, which is perpendicular to the direction of drawing in FIG. 1. In doing so, the guide arm 30 is guided through an elongate opening 31 (depicted by a dashed line) in the wall 4, along which the guide arm 30 is movable.

The exemplary additive manufacturing device 1 further comprises an energy input device 20 having a laser 21 that generates a laser beam 22 which is deflected by a deflection device 23 and focused onto the working plane 10 by a focusing device 24 via a coupling window 25 provided at the upper side of the process chamber 3 in the wall thereof.

In laser sintering or laser melting, an energy input device can comprise, for example, one or more gas or solid state lasers or any other type of laser such as laser diodes, in particular VCSEL (Vertical Cavity Surface Emitting Laser) or VECSEL (Vertical External Cavity Surface Emitting Laser), or a row of such lasers. The specific structure of a laser sintering or melting device shown in FIG. 1 is therefore only exemplary for the present invention and can of course be modified, in particular when using a different energy input device than the one shown.

Furthermore, the laser sintering device 1 comprises a control unit 29 by means of which the individual components of the device 1 are controlled in a coordinated manner to implement the building process. The control unit can include a CPU whose operation is controlled by a computer program (software). The computer program can be stored separately from the device on a storage medium from which it can be loaded into the device, in particular into the control unit.

In operation, in order to apply a powder layer, the support 7 is first lowered by an amount that corresponds to the desired layer thickness. A layer of the building material in powder form 13 is then applied by moving the recoater 14 across the working plane 10. Application is carried out at least across the entire cross-section of the object 2 to be produced, preferably in the entire build area, i.e. the area of the working plane 10 that is located within the upper opening of the container 5. Subsequently, the cross-section of the object 2 to be produced is scanned by the laser beam 22 so that the building material in powder form 13 is solidified at the locations corresponding to the cross-section of the object 2 to be manufactured. These steps are repeated until the object 2 is completed and can be removed from the process chamber 3.

To move the recoater 14 across the working plane 10, the guide arm 30 is moved by the drive along the longitudinal direction of the opening 31 in the chamber wall 4, indicated in FIG. 1 by the double arrow with reference sign H.

Figure 8:
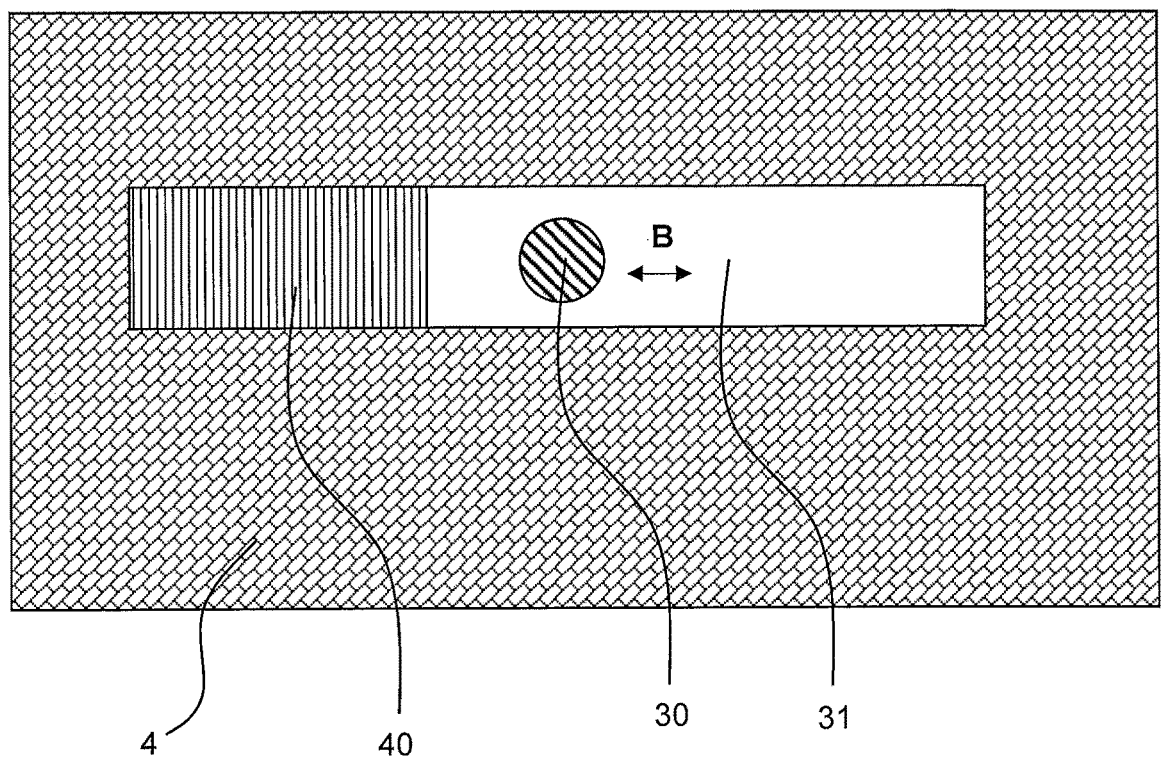
FIG. 8 is a schematic elevation view of a chamber wall of a process chamber in which a cover device in a state with a small extent of the cover area covers only a part of an opening in the chamber wall.

In this respect, FIG. 8 shows an elevation view of the chamber wall 4 with the elongate opening 31 therein. Only schematically, a cross-section through the guide arm 30 is shown, which is movable in the elongate opening 31 in the direction of movement H indicated by the double arrow, which is identical to the longitudinal direction of the opening 31.

Figure 9:
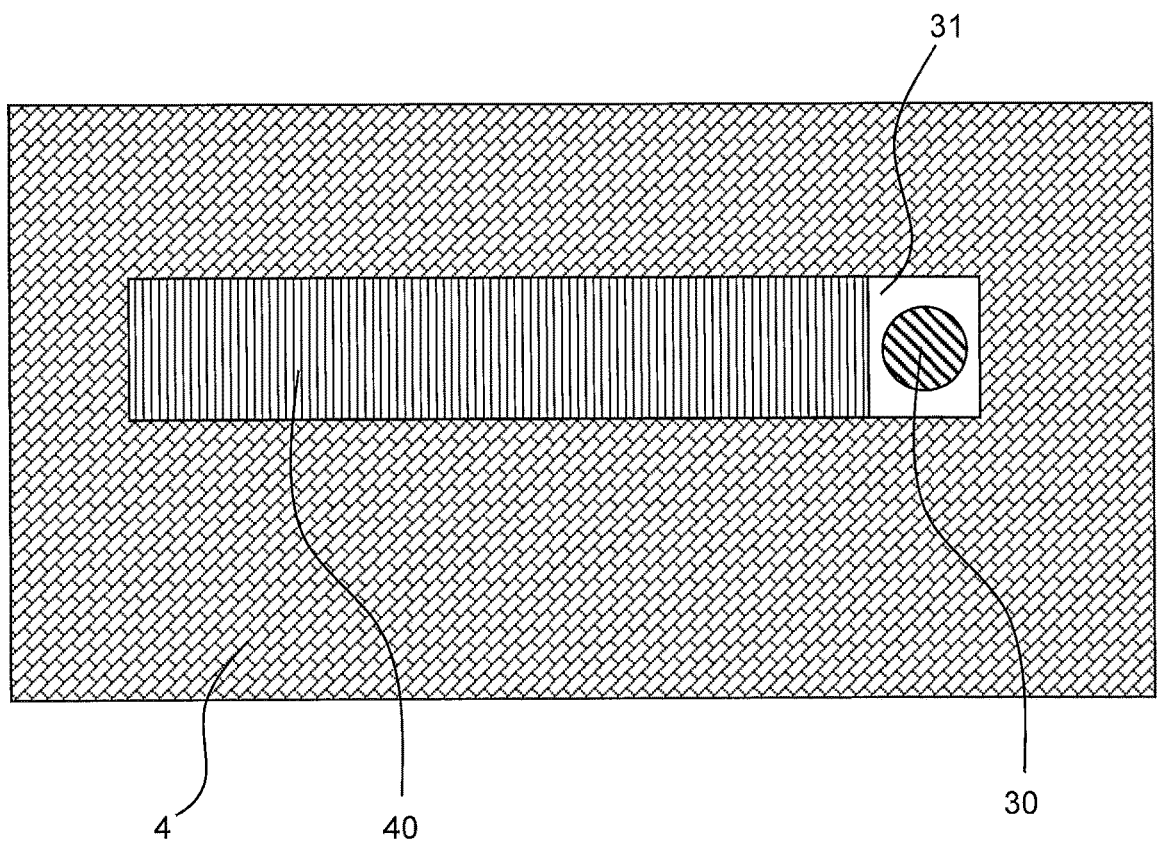
FIG. 9 is a schematic elevation view of a chamber wall of a process chamber in which a cover device in a state with almost maximum cover area covers almost the entire opening in the chamber wall.

Furthermore, in FIG. 8 a cover device 40 can be seen, the extent of which can be varied in the longitudinal direction of the opening 31. While FIG. 8 shows the cover device 40 in a state with a small extent, in which only a small part of the opening 31 is covered, FIG. 9 accordingly shows a situation in which the cover device 40 covers a large part of the opening 31 and thereby closes it. For example, in FIG. 8 the guide arm 30 could be located relative to the build area at the position shown in FIG. 1, whereas in FIG. 9 the guide arm 30 is located near or beyond the right edge of the building container 5 in FIG. 1.

Figure 2:
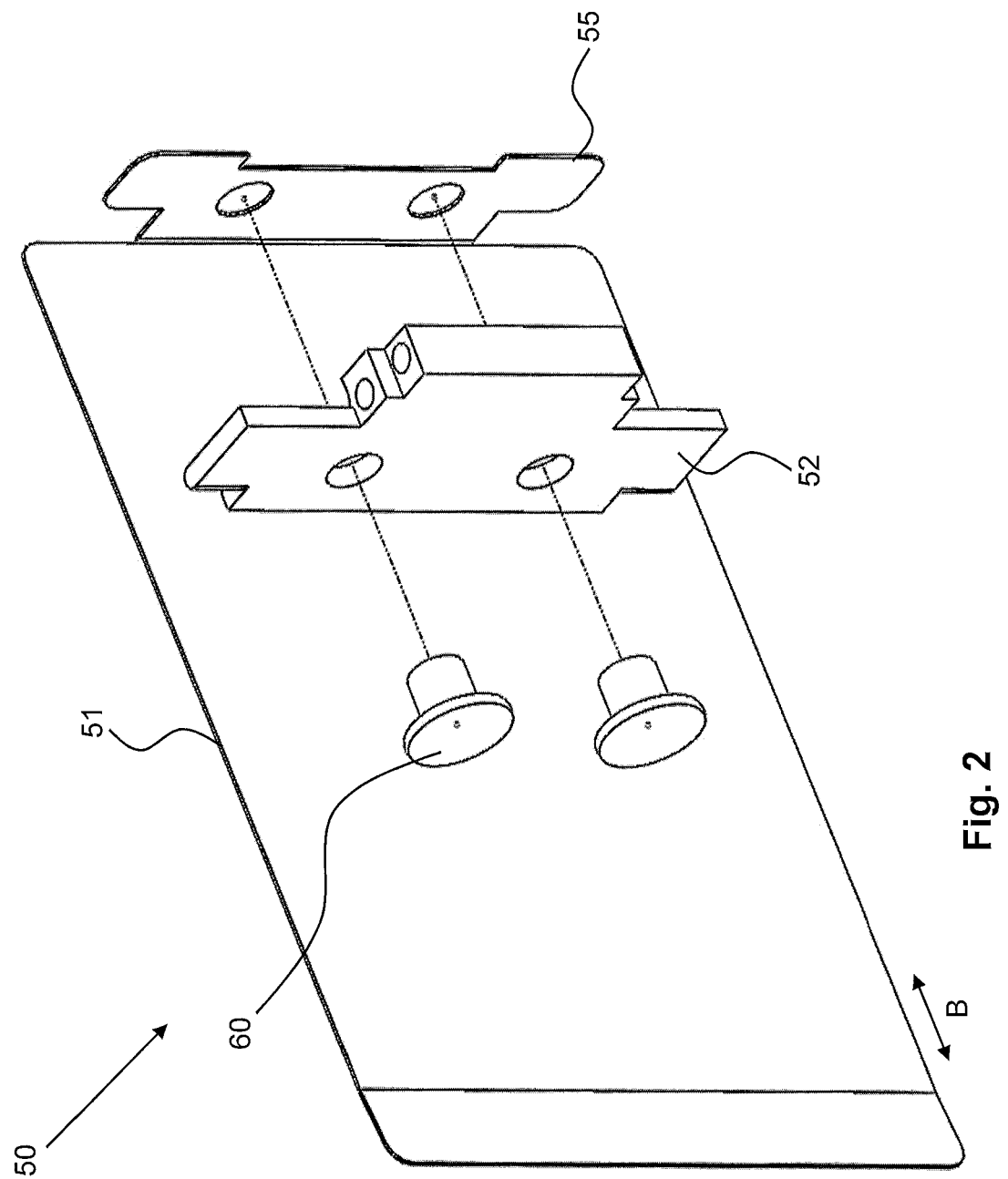
FIG. 2 is a schematic view of an individual element of an exemplary covering device according to the invention.
Figure 5:
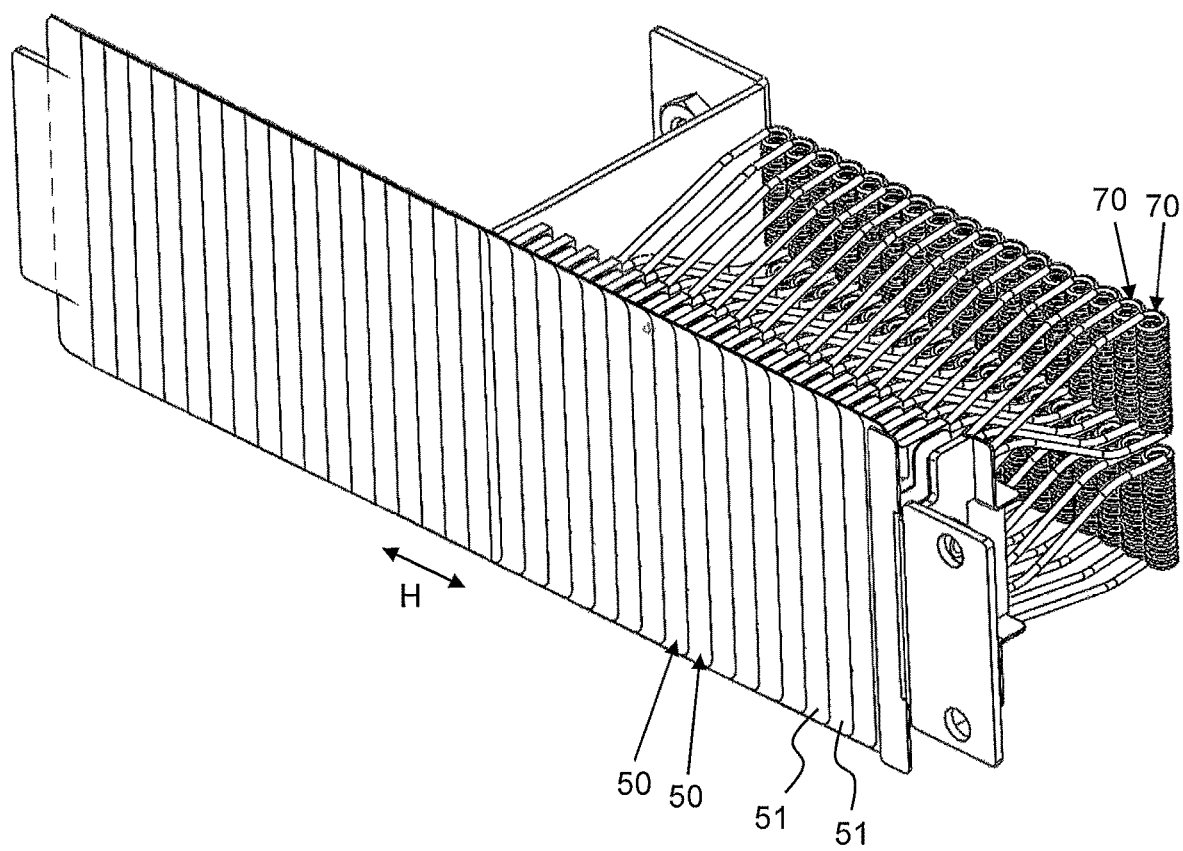
FIGS. 5 and 6 are different views of an exemplary cover device according to the invention.
Figure 6:
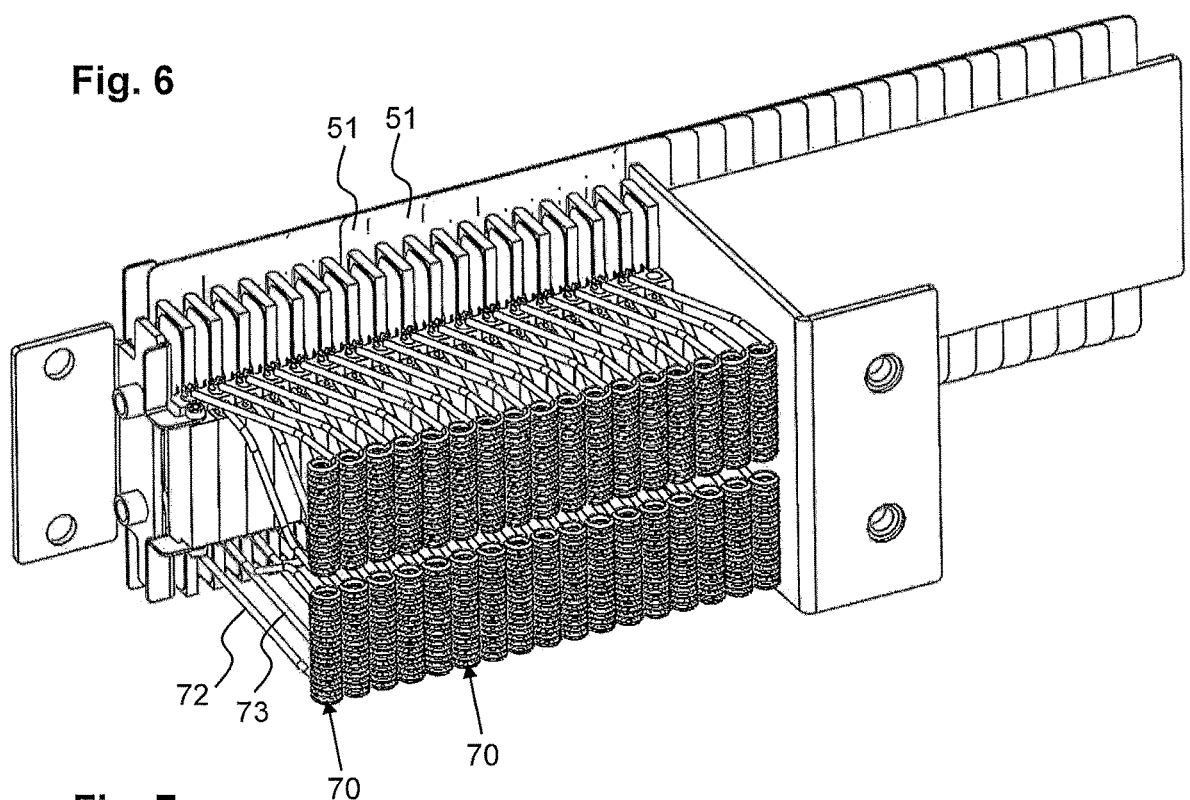
Figure 7:
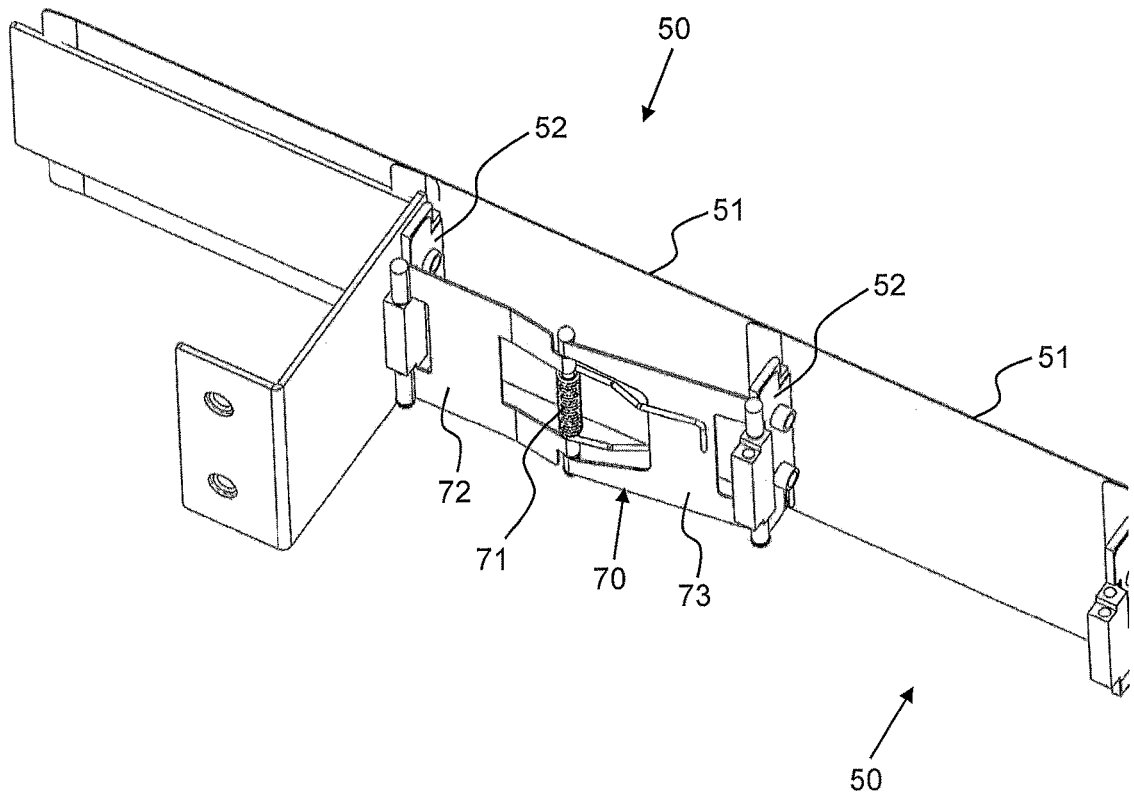
FIG. 7 shows an example of a connection element comprising a spring element.

As can be seen from FIGS. 5 to 7, the cover device 40 comprises a plurality of individual elements 50 which, when the cover device is arranged in the opening 31, are movable relative to one another in the longitudinal direction of the opening 31 (i.e. in the direction of movement H in FIG. 5). The structure of an individual element 50 is shown in FIG. 2. An individual element substantially consists of a lamella 51 and a lamella support 52, which is attached to the lamella 51. In this regard, FIG. 2 exemplarily shows attachment of the lamella support to the lamella by means of pin elements 60 which engage a lamella attachment 55 connected to the lamella 51. The pin elements 60 are attached to the lamella attachment 55 by means of an interference fit or alternatively by screwing or riveting, for example. However, any other fastening is also possible, for example by means of a welding connection or adhesive connection.

When the individual elements 50 are moved against one another in the direction of movement H in the cover device 40, then this results in setting a different mutual degree of overlap of the lamellas 51. In this respect, FIGS. 5 and 6 show a state in which the lamellas of two adjacent individual elements 50 in each case overlap almost completely. While the view of FIG. 5 shows the front side of the lamellas, which front side faces the outside of the chamber wall 4 in the assembled state of the cover device 40, FIG. 6 shows a view in which the rear side of the lamellas is shown, which rear side faces the interior of the process chamber.

FIG. 7 shows a state in which the lamellas 51 of the individual elements 50 overlap to only a very small extent. Thus, in this state the cover device 40 has its almost greatest extent. Furthermore, it can be seen in FIG. 7 that two individual elements 50 are connected to one another via a connection element 70. In this example, the connection element 70 is attached to the respective lamella supports 52 of two adjacent individual elements 50. Preferably, the connection element is capable of changing its dimension between the two locations with which it engages the two individual elements 50 (the locations engaging the lamella supports 52 in FIG. 7). In this way, the extent of the cover device 40 can also be modified.

In the example of FIG. 7, a torsion spring 71 connecting two wing elements 72 and 73 serves to impart elasticity to the connection element 70 in the direction in which the individual elements 50 are to be displaced relative to one another. Each of the two wing elements 73 and 74 engages the corresponding lamella support 52 by means of a pivot joint or hinge joint (a screw joint would also be possible). While FIG. 7 shows a connection element 70 in a state in which it has its largest dimension or extent in the direction of displacement of the individual elements 50, FIGS. 5 and 6 each show a plurality of connection elements 70 in a pushed-together state in which the dimension or extent of the connection elements in the direction of displacement of the individual elements 50 is minimal. Here, the wing elements 72 and 73 are formed as frames of rod-shaped elements in FIGS. 5 and 6, in contrast to the plate elements in FIG. 7.

If the engagement points of the connection elements 70 on a lamella support 52 are different from one another, in particular have an offset from one another in a direction perpendicular to the direction of displacement of the individual elements 50, then this generates a tilting moment or torque at the lamella support 52 and therefore at the individual element 50. This is shown schematically in FIG. 3, in which the tensile force of the connection elements 70 upon the lamella support 52 in the middle is illustrated by means of straight arrows. Since the engagement points 54 and 55 for the two lamella supports 70 are different, a torque illustrated by a curved arrow is generated at the left individual element, which presses the lamella 51 of the left individual element with its end that is remote from the lamella support 52 connected to the lamella against the adjacent individual element (in particular the adjacent lamella). In this way, the tightness of the cover device 40 can be increased, in particular with regard to a possible leakage of building material and to the leakage of thermal energy from the process chamber. Gas exchange is also greatly reduced as a result.

Figure 3:
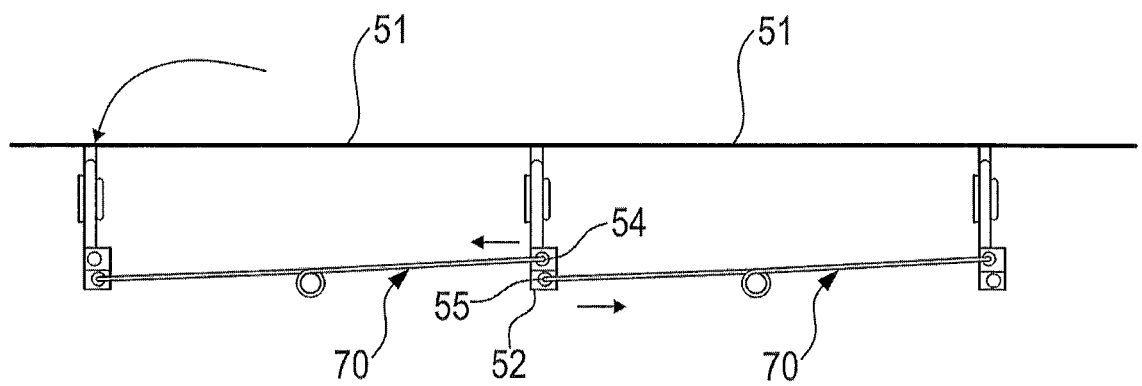
FIG. 3 is a schematic view of three individual elements from the side to depict the generation of a tilting moment by means of the two connection elements engaging an individual element.
Figure 4:
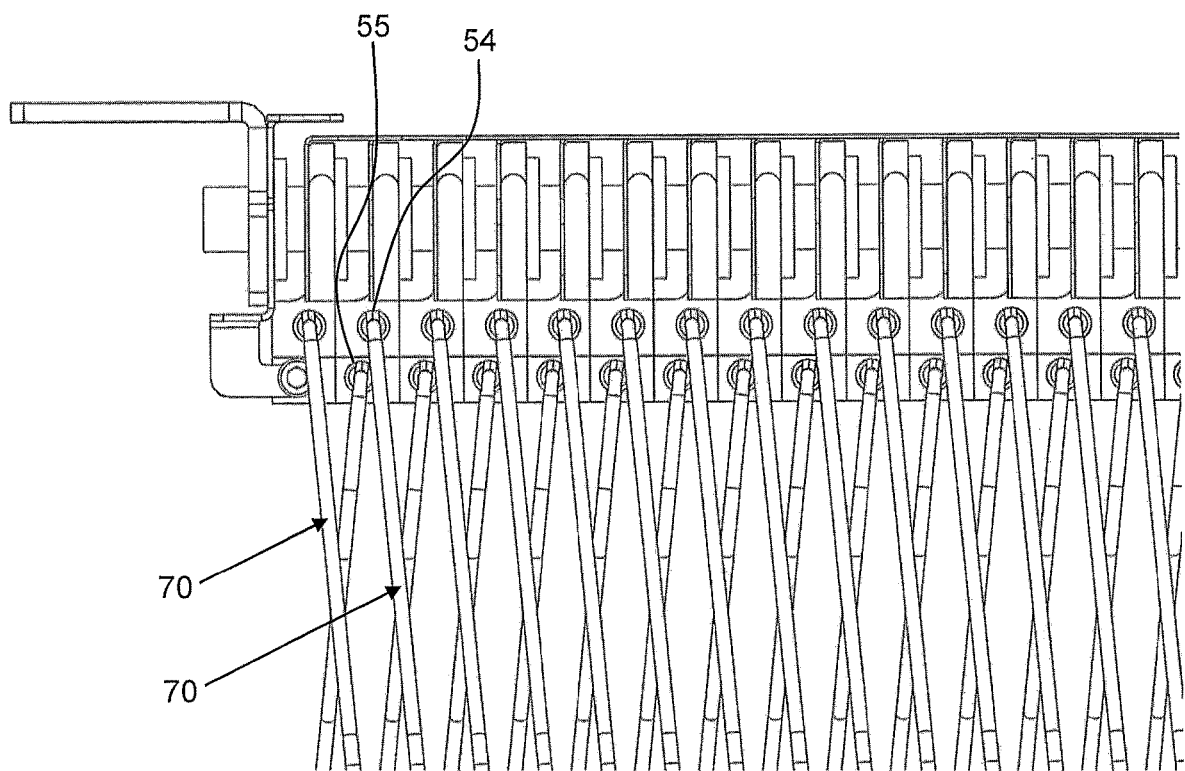
FIG. 4 depicts the situation of FIG. 3 for a plurality of connection elements.

FIG. 4 illustrates the situation of FIG. 3 for a plurality of connection elements 70.

Figure 10:
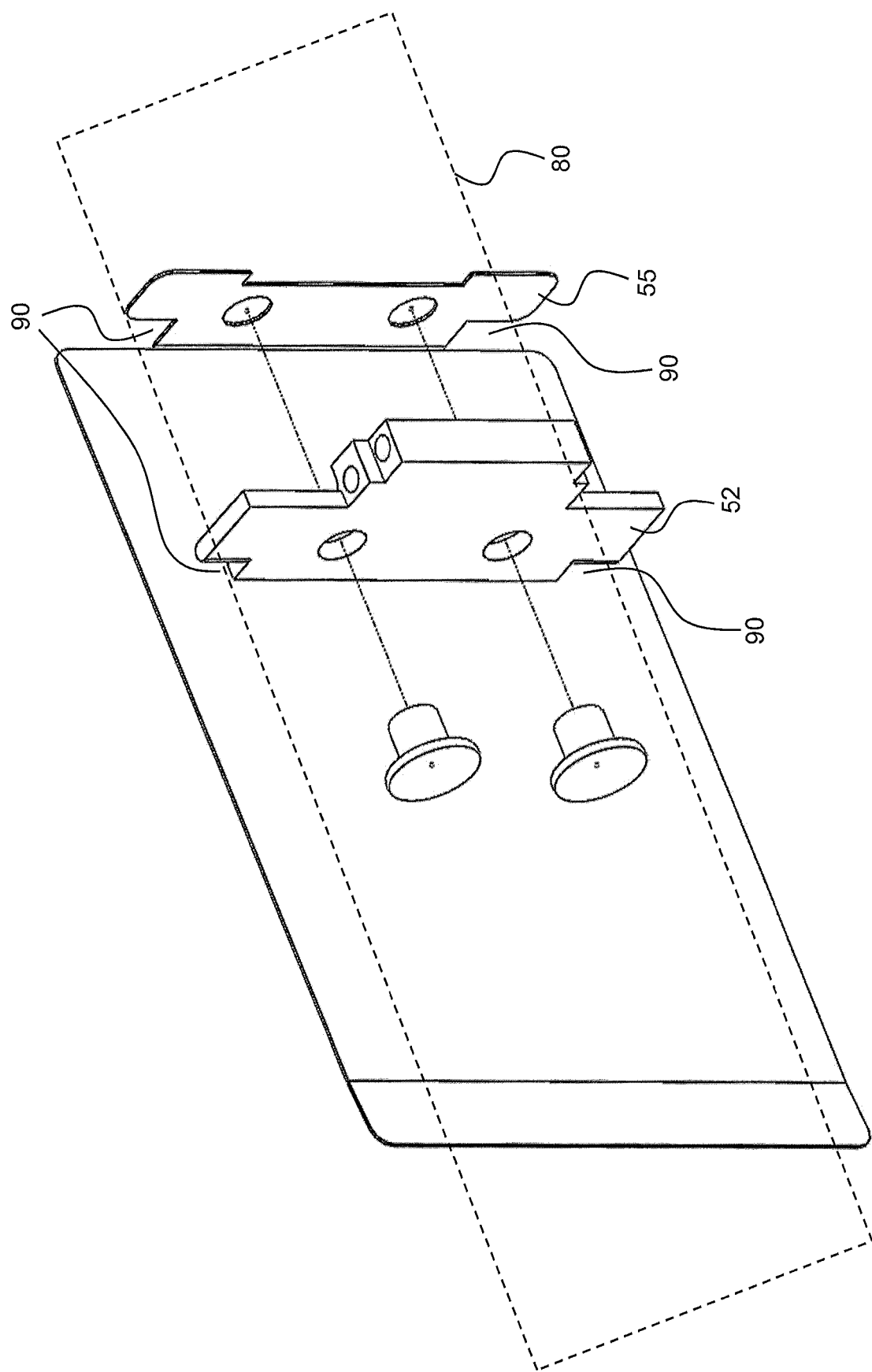
FIG. 10 is a schematic view of an individual element similar to that of FIG. 2, but illustrating the contact of the individual element with a guide rail.
Figure 11:
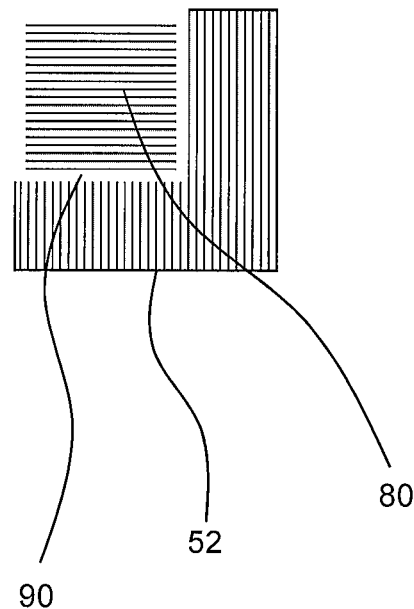
FIGS. 11 and 12 show different examples of the shape of the rail and the recess on the lamella supports.
Figure 12:
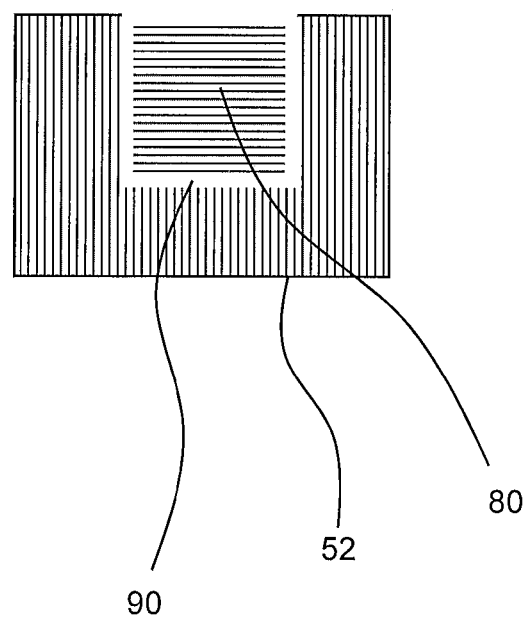

In order to stabilize the relative movement of the individual elements 50 with respect to one another, it is convenient to guide the movement of the individual elements 50, in particular along a guide rail. This is depicted in FIG. 10, which is essentially identical to the illustration of an individual element in FIG. 2. In FIG. 10 the guide rail 80 is shown dashed in a very schematic manner. Recesses 90 can be seen at the upper and lower edges of the lamella support 52, which recesses can rest with two sides against the guide rail 80. This is illustrated in FIG. 11, which is a view in cross-section of the guide rail 80 together with a part of the lamella support 52. For the sake of clarity, the figure shows a gap between the rail 80 and the lamella support 52, which of course is not present when the lamella support is in contact with the rail 80 on one side or two sides. FIG. 12 shows the case in which the recess 90 is not formed at a corner of the lamella support, but as a gap in the upper edge of the lamella support 52. In this case, the lamella support encloses the guide rail in a U-shape.

There are no restrictions on the shape of the recess 90 and the corresponding shape of the profile of the guide rail 80. For example, a triangular recess and a corresponding rail profile or, for example, a dovetail connection between recess and rail are also possible. In any case, it is advantageous to guide the movement with as little friction as possible, and in some circumstances it is possible to use rolling elements between the rail and the individual elements for this purpose.

Metal can be used as a material for the individual elements 50, since this can ensure sufficient stability of the lamellas with a low lamella thickness. Since as little heat as possible is to be transmitted through the cover device, steel or titanium are particularly suitable materials. To increase the heat reflectivity, the individual elements, in particular the lamellas, can either be polished on the side facing the interior of the process chamber or can be provided with a coating that has a high reflectivity for infrared radiation, e.g. nickel. A coating can also be used to make the locations of the individual elements sliding along the guide rail 80 or the surface of the guide rail more resistant to abrasion or to improve the sliding properties, for example a Teflon-based coating. A suitable material based on PTFE with bronze admixture is offered, for example, by the company Murtfeldt Kunststoffe GmbH & Co. KG, Dortmund under the name "Murflor®+Bronze" and has a coefficient of sliding friction (dry) of 0.14 and a temperature resistance of up to 260° C.

The invention claimed is:

1. An additive manufacturing device for manufacturing a three-dimensional object by selective solidification of a building material layer by layer, comprising:
   a process chamber having a chamber wall with an opening; and
   a cover device having a cover area for covering and/or shielding the opening, an extent of the cover area being variable in a longitudinal direction of the opening and the cover device comprising individual elements that are connected to one another in such a way that the individual elements are movable relative to one another in the longitudinal direction of the opening,
   wherein at least one of the individual elements includes first and second connection points where first and second connection elements, respectively, couple the at least one of the individual elements to adjacent individual elements of the individual elements, and
   wherein the first and second connection points are offset from one another in a direction perpendicular to a plane of the cover area.

2. The additive manufacturing device according to claim 1, wherein the extent of the cover area in the longitudinal direction of the opening can be varied by a relative movement of the individual elements with respect to one another in the longitudinal direction of the opening.

3. The additive manufacturing device according to claim 1, wherein at least one of the first and second connection elements is an elastic element.

4. The additive manufacturing device according to claim 3, wherein the elastic element is connected to the at least one of the individual elements by a hinge.

5. The additive manufacturing device according to claim 1, wherein two individual elements of the individual elements each comprises a lamella and wherein at least one of the first and second connection elements is arranged between the two individual elements, the at least one of the first and second connection elements engaging at a lamella support extending transverse to a lamella plane.

6. The additive manufacturing device according to claim 5, wherein the lamellas overlap if the opening is not completely covered.

7. The additive manufacturing device according to claim 5, wherein the lamellas include a heat-reflecting surface and are made of metal.

8. The additive manufacturing device according to claim 1, further comprising a process module movable within the process chamber in a direction of movement across a build area, the process module being suited to carry out a process required for producing the three-dimensional object, wherein the direction of movement is parallel to the longitudinal direction of the opening and wherein an external connection element is attached to the process module, the external connection element passing through the opening.

9. The additive manufacturing device according to claim 8, wherein the cover device is connected to the external connection element in such a way that when the external connection element moves in the longitudinal direction of the opening, the extent of the cover area is varied in the longitudinal direction of the opening.

10. The additive manufacturing device according to claim 8, wherein the cover device is arranged in the longitudinal direction of the opening on both sides of the external connection element.

11. The additive manufacturing device according to claim 1, wherein the opening comprises edges and the cover device is mounted on the edges of the opening in such a way that the cover device can be disassembled.

12. A cover device for reversibly covering an opening in a chamber wall of a process chamber of an additive manufacturing device for manufacturing a three-dimensional object by selective solidification of a building material layer by layer, the cover device comprising:
   a cover area for covering and/or shielding the opening, an extent of the cover area being variable in a longitudinal direction of the opening; and
   individual elements that are connected to one another in such a way that the individual elements are movable relative to one another in the longitudinal direction of the opening,
   wherein at least one of the individual elements includes first and second connection points where first and second connection elements, respectively, couple the at least one of the individual elements to adjacent individual elements of the individual elements, and
   wherein the first and second connection points are offset from one another in a direction perpendicular to a plane of the cover area.

13. An additive manufacturing method for manufacturing a three-dimensional object by selective solidification of a building material layer by layer within a process chamber having a chamber wall that has an opening, comprising:
   covering the opening and/or shielding the opening by a cover device having a cover area to an extent variable in a longitudinal direction of the opening, wherein the cover device comprises individual elements that are connected to one another in such a way that the individual elements are movable relative to one another in the longitudinal direction of the opening,
   wherein at least one of the individual elements includes first and second connection points where first and second connection elements, respectively, couple the at least one of the individual elements to adjacent individual elements of the individual elements, and
   wherein the first and second connection points are offset from one another in a direction perpendicular to a plane of the cover area.

14. The additive manufacturing method according to claim 13, wherein a process module is present within the process chamber, the process module being movable in a direction of movement across a build area and being suited to carry out a process required for producing the three-dimensional object, wherein the direction of movement is identical to the longitudinal direction of the opening, wherein an external connection element is attached to the process module, the external connection element passing through the opening, and wherein during the process, the process module is moved at a speed of at least 200 mm/s and/or is subjected to an acceleration of at least 1 m/s$^2$.

\* \* \* \* \*